(12) United States Patent
Hu

(10) Patent No.: US 9,733,048 B2
(45) Date of Patent: Aug. 15, 2017

(54) SHOOTING TRAINING AND GAME SYSTEM WITH VIRTUAL TARGET

(71) Applicant: EGISMOS TECHNOLOGY CORPORATION, Taipei (TW)

(72) Inventor: Di-Sheng Hu, Taipei (TW)

(73) Assignee: EGISMOS TECHNOLOGY CORPORATION, Newark, New Castle, DE (US)

( * ) Notice: Subject to any disclaimer, the term of this patent is extended or adjusted under 35 U.S.C. 154(b) by 187 days.

(21) Appl. No.: 14/590,546

(22) Filed: Jan. 6, 2015

(65) Prior Publication Data

US 2016/0195364 A1   Jul. 7, 2016

(51) Int. Cl.

| | |
|---|---|
| A63F 13/10 | (2006.01) |
| F41G 3/26 | (2006.01) |
| A63F 13/426 | (2014.01) |
| A63F 13/27 | (2014.01) |
| A63F 13/837 | (2014.01) |
| A63F 13/213 | (2014.01) |

(52) U.S. Cl.
CPC ............ *F41G 3/2633* (2013.01); *A63F 13/27* (2014.09); *A63F 13/426* (2014.09); *F41G 3/2655* (2013.01); *A63F 13/213* (2014.09); *A63F 13/837* (2014.09)

(58) Field of Classification Search
CPC .................................. A63F 13/12; A63F 13/10
See application file for complete search history.

(56) References Cited

U.S. PATENT DOCUMENTS

| | | |
|---|---|---|
| 6,614,422 B1 | 9/2003 | Rafii et al. |
| 6,937,372 B2 | 8/2005 | Kandori et al. |
| 7,972,014 B2 | 7/2011 | Hung et al. |
| 2009/0104990 A1* | 4/2009 | Tsujino ................... A63F 13/04 463/32 |
| 2009/0181737 A1* | 7/2009 | Argentar ................. A63F 13/02 463/2 |
| 2012/0162077 A1 | 6/2012 | Sze et al. |
| 2012/0196676 A1* | 8/2012 | Login ..................... A63F 13/10 463/31 |
| 2014/0055364 A1 | 2/2014 | Sze et al. |

OTHER PUBLICATIONS

See YouTube video, URL: https://www.youtube.com/watch?v=6fizH6zVFCY Accessed Nov. 21, 2016 but uploaded 2007.*
See NPL Wikipedia Article, "Duck Hunt", screenshot enclosed, created as eaarly as 2009.*

* cited by examiner

*Primary Examiner* — Omkar Deodhar

(74) *Attorney, Agent, or Firm* — Muncy, Geissler, Olds & Lowe, P.C.

(57) ABSTRACT

A shooting training and game system with virtual targets is revealed. The system includes a main controller, a projection module, a lens module, and a shooting tool. The shooting tool can be a real gun or a laser gun. By hardware and software of the main controller, the projection module projects a light beam to a screen therefront to form a target image area with at least one static or dynamic virtual target. Then the lens module is aligned to the target image area for detecting and obtaining relative positions and coordinates of each shot formed on the target image area by the shooting tool. Thereby an error of each shot is calculated for evaluation of shooting accuracy. The shooting training and game system is more interesting, optional and used more efficiently.

10 Claims, 5 Drawing Sheets

SHOOTING TRAINING AND GAME SYSTEM WITH VIRTUAL TARGET

BACKGROUND OF THE INVENTION

Fields of the Invention

The present invention relates to shooting training and game system, especially to a shooting training and game system with virtual targets and including a main controller, a projection module, a lens module, and a shooting tool. The shooting tool can be a real gun or a laser gun.

Descriptions of Related Art

In many prior arts related to a virtual input device formed by projection techniques such as U.S. Pat. No. 6,614,422, US2012/0162077, and US2014/0055364, a system using a virtual input device such as a virtual keyboard or virtual mouse for data input and a method thereof are revealed. The system mainly includes a projection means and a lens device.

Moreover, scanning projection apparatuses have been broadly applied to optical filed. For example, the scanning projection apparatus is designed into a laser scanning unit (LSU) or a laser projector. The LSU is used in printers, scanners, etc. while the laser projector is applied to smaller laser projectors or head-up device (HUD). The scanning projection apparatus uses at least one dimensional beam deflecting device to deflect at least one light beam from a light source and form an image area with at least one dimension. The light source can be a laser or a light emitting diode (LED) light source. The image area with at least one dimension is an area formed by a scanning beam deflected by the beam deflecting device and projected on a target area. For example, a beam deflecting device used in the smaller laser projector or the head-up device (HUD) deflects and projects a light beam to a target area to form a 2-dimensional image area by using a beam scanner that provides dual-axis (two-dimensional) scanning or single-axis (one-dimensional) scanning. In order t produce a small-size laser projector, a microelectronic mechanical system (MEMS) scanning module is used as the beam scanner. In conventional scanning projection apparatuses revealed in U.S. Pat. No. 6,937,372B2 and U.S. Pat. No. 7,972,014B2, a light beam is scanned in a raster pattern or Lissajous pattern to form the image area and the image includes charts or figures. The image pixels required for the image area can be achieved by determination of beam position and modulation of beam power according to the image data received.

Furthermore, besides MEMS mirror/module related techniques, techniques related to liquid-crystal displays (LCD), digital light processing (DLP) and galvanometric scanners can be used in projection. In practice, manufactures or designers can select projection technique according to their needs in use or design requirements (such as use environment, production cost, etc.).

Thus techniques related to the virtual input devices and the projection apparatuses are mature. However, the techniques mentioned above have not been applied to shooting training system and/or games. The present invention combines the virtual-input-device related techniques with the projection-apparatus related technique to form a shooting training and game system having virtual targets. The shooting training and game system is not only more interesting and optional, but also having higher efficiency in use.

SUMMARY OF THE INVENTION

Therefore it is a primary object of the present invention to provide a shooting training and game system in which an error of each shot is calculated for evaluation of shooting accuracy. Moreover, each shot, the error or each target being hit can be shown on a target image area. Thus the shooting training and game system has more options and interest. The efficiency of the shooting training and game system is also improved. In order to achieve the above object, a shooting training and game system with virtual targets of the present invention includes a main controller, a projection module, a lens module, and a shooting tool. By hardware and software of the main controller, the projection module projects a light beam to a screen therefront to form a target image area with at least one static or dynamic virtual target. Then the lens module is aligned with the target image area for detecting and obtaining relative positions and coordinates of each shot within the target image area by the shooting tool. Thereby the error of each shot can be calculated.

The shooting tool can be a real gun or a laser gun. Each shot formed in the target image area by the shooting tool can be a bullet hole formed by the real gun or a light spot formed by the laser gun. The laser gun emits invisible infrared laser pulse (IR laser pulse) or visible laser light to the target image area.

When the shooting tool is the laser gun, the wavelength of laser light emitted from the laser gun is ranging from 785 nm to 808 nm and no more than 808 nm while the duration of the laser light is no less than 0.1 second (≥0.1 sec.). Moreover, the distance between the target image area of the screen and the projection module can be, but not limited to 2.5 m. The projection module can be a microelectronic mechanical system (MEMS) scanning module and the target image area is located on the screen in front of the projection module.

The projection module includes a MEMS scanning module, a liquid crystal display (LCD) module, a digital light processing module, and a galvanometric scanner module.

The virtual target projected on the target age area by the projection module includes at least one static virtual target or dynamic virtual target.

The projection module and the lens module are mechanically connected to and fixed by each other to form a solid object. The detection area of the lens module is aligned with or nearly equal to the target image area. Thus the lens module can detect and obtain relative positions and coordinates of each shot in the target image area.

The main controller is a mobile Android device such as a smart phone, a tablet computer, etc.

In order to allow users using the system more conveniently, the user can switch to a calibration mode at an initial stage. In the calibration mode, the projection module and the lens module are aligned with each other and then both maintained at the alignment state.

The number of the shots on the virtual target image area formed by the shooting tool is no less than en. The relative position of each shot is detected and obtained by the lens module.

The virtual target projected on the target image area by the projection module is a dynamic moving target such as a moving green circle. When the user shoots the moving target by the shooting tool such as a real gun or laser gun and the shot is within the moving target, a sign of "HIT" that represents the target is hit is projected on the target image area by the design of software or firmware set in the main controller or the system. Thus the shooting training and game system is more interesting.

When the shooting tool is a laser gun and a plurality of invisible shots is formed due to shot of invisible light such as IR laser pulse to the target image area, the user can choose a capture mode of the lens module and a shot display mode of the projection module. Thus each shot is projected and shown on the target image area by visible laser light such as green laser light after the lens module detecting and obtaining relative positions (or coordinates) of the invisible shots.

The virtual target projected on the target image area can be a static, fixed target such as a green dart board having a center point. When the shot falls around the center point of the fixed target, the fixed virtual target, the shot and an additional shooting score (such as error) are shown on the target image area by the projection module due to software or firmware preset in the main controller or the system. Thus the shooting game is more interesting.

The virtual target projected on the target image area by the projection module can be a plurality of static or moving targets such as moving or fixed green circles. When the shooting tool shoots the targets and the shots fall in the target, a burst figure is shown at the shot target on the target image area by the projection module due to software or firmware preset in the main controller or the system. The shooting or game is more interesting.

The system of the present invention uses a mobile Android device such as a smart phone, a tablet computer, etc to control the projection module (MEMS scanner/module). Moreover, Bluetooth-enabled MEMS controller is also used to control the projection module formed by MEMS.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Please refer to following embodiments for details of structure and technical features of the present invention.

Figure 1:
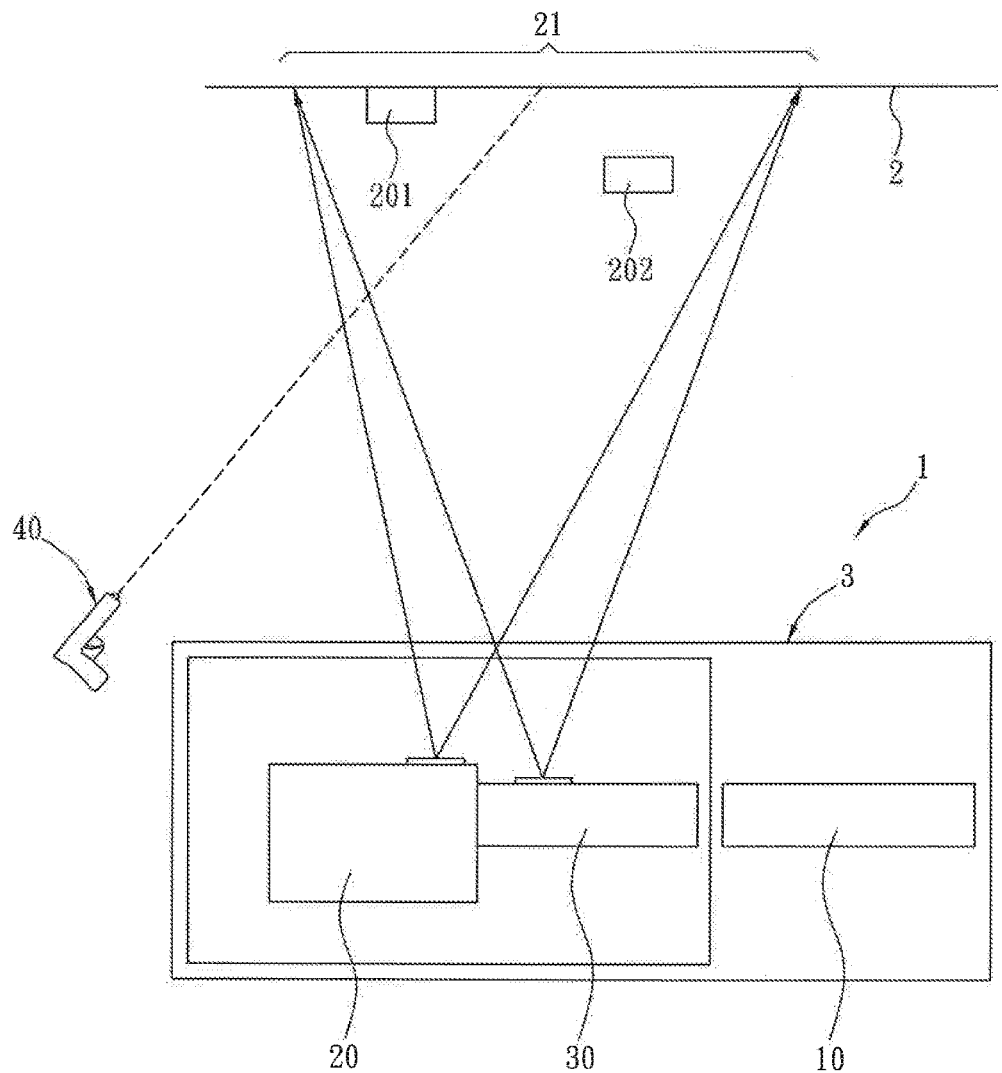
FIG. 1 is a schematic drawing showing a top view of an embodiment according to the present invention.
Figure 2:
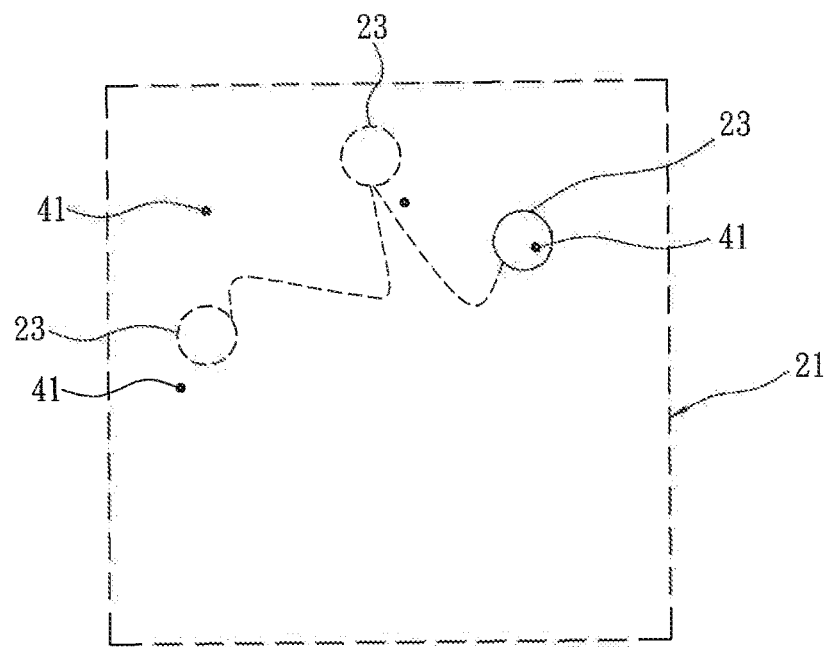
FIG. 2 is a schematic drawing showing a moving target projected on a virtual target image area of an embodiment according to the present invention.

Refer to FIG. 1, a shooting training and game system with virtual targets 1 of the present invention includes a main controller 10, a projection module 20, a lens module 30, and a shooting tool 40. Due to system control functions of the main controller 10 (such as hardware, software or firmware preset in the system 1), a light beam emitted from a light source (not shown in figure) is deflected and projected by the projection module 20 to form a virtual target image area 21 on a screen 2 (such as a white wall). The screen 2 is in front of the projection module 20 and there is a certain distance between the screen 2 and the projection module 20. The images shown on the virtual target image area 21 includes static virtual targets (as shown in FIG. 4-5, FIG. 6-7 and FIG. 8-9) or dynamic virtual targets (as shown in FIG. 2).

While the system 1 of the present invention is used as a game system, the screen 2 is preferred, but not limited to, a white wall. The screen 2 is not necessary to be flat completely. For example, a projecting area 201 is formed on the screen 2 or a barrier 202 is arranged in front of the screen 2, as shown in FIG. 1. As long as the projecting area 201 and the barrier 202 will not affect user's (shooter's) vision (seeing/aiming). The image (virtual target) projected on the target image area 21 by the projection module 20 can also be projected on the surface of the projecting area 201 or the barrier 202. Thus the user (shooter) can also see (watching/aiming) the virtual target.

Figure 3:
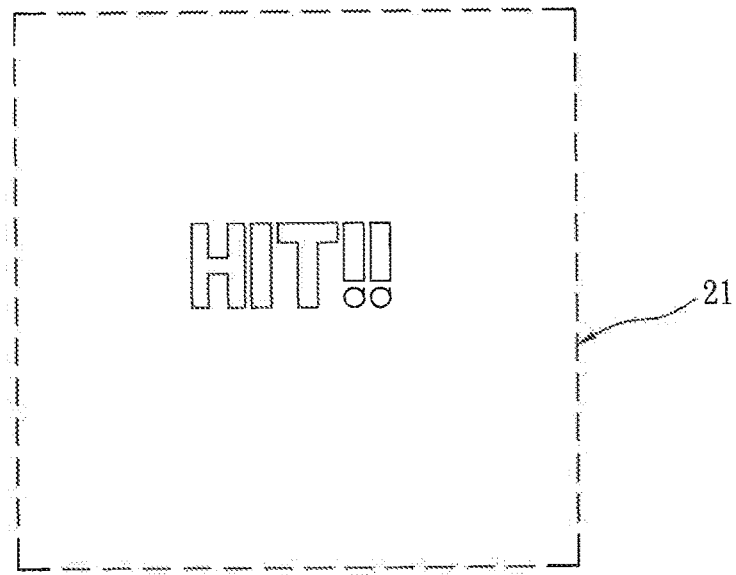
FIG. 3 is a schematic drawing showing the target in the embodiment in FIG. 2 being shot according to the present invention.

The lens module 30 is aligned with the virtual target image area 21 for detecting and obtaining relative positions and coordinates of each shot 41 (as shown in FIG. 2, FIG. 4, FIG. 6 and FIG. 8) on the virtual target image area 21. Thereby the system 1 calculates the error of each shot 41 and used the error for evaluation of shooting accuracy (as shown in FIG. 2 to FIG. 9 and the details are described in the following). Each shot 22 (41) (as shown in FIG. 5, FIG. 7 and FIG. 9), error (as shown in FIG. 7) or shooting status of each target (as shown in FIG. 3 and FIG. 9) can also be projected and shown on the target image area 21 by the projection module 20. Thereby the shooting training and game system of the present invention is more optional, interesting, and having higher efficiency.

As shown in FIG. 1, the shooting tool 40 includes a real gun and a laser gun. The shots 41 formed on the target image area 21 consist of bullet holes of the real gun and visible/invisible light spots emitted from the laser gun.

When the shooting tool 40 is the laser gun, invisible infrared laser pulse (IR laser pulse) or visible laser light is emitted from the laser gun 40 to the target image area 21 to form invisible light spots or visible light spots. In an embodiment of the present invention, the wavelength of the laser light is ranging from 785 nm to 808 nm and no more than 808 nm. The duration of the laser light is no less than 0.1 second (≥0.1 sec.). Moreover, the distance between the target image area 21 of the screen and the projection module 20 can be, but not limited to 2.5 m. The projection module can be a microelectronic mechanical systems (MEMS) scanning module.

Refer to FIG. 1, the projection module 20 is selected from the group consisting of a MEMS scanning module, a liquid, crystal display (LCD) module, a digital light processing module, and a galvanometric scanner module. In a preferred embodiment of the present invention, the projection module 20 is the MEMS module.

In an embodiment of the present invention, the virtual target projected on the target image area 21 by the projection module 20 includes at least one static virtual target (a static target 24 shown in FIG. 6) or a dynamic virtual target (a moving target 23 shown in FIG. 2). The static virtual target is defined, as the virtual target projected on the target image area 21 that is at one fixed point while the dynamic virtual target is defined as the virtual target projected on the target image area 21 that is moved continuously. Moreover, when the virtual target projected having a plurality of targets is shown in different positions non-periodically (such as a plurality of targets 24 in FIG. 8), the targets can be either static or dynamic.

Refer to FIG. 1, the projection module 20 and the lens module 30 are mechanically connected to and fixed by each other to form a solid object 3. And the detection area of the lens module 30 is aligned with or nearly equal to the target image area 21 projected by the projection module 20. Thus the lens module 30 can detect and obtain relative positions and coordinates of each shot 41 on the virtual target image area 21 formed by the shooting tool 40.

As shown in FIG. 1, the main controller 10 can be a mobile Android device such as a smart phone, a tablet computer, etc. Thus the shooting game system of the present invention can be preset with software or firmware required by the device for users to select and use. Android is a mobile operating system (OS) based on the Linux kernel.

Refer to FIG. 2, the virtual target projected on the target image area 21 by the projection module 20 is a moving target 23. In the figure, each moving target 23 is a moving green circle formed by projection of green-colored laser light. When the user shoots the moving target 23 by the shooting tool 40 such as a real gun/or laser gun and the shot 41 falls on the moving target, a sign of "HIT" that represents the target is hit is projected on the target image area 21 by the design of hardware, software or firmware set in the main controller 10 or the system 1, as shown in FIG. 3. Back to FIG. 2, the moving target 23 is not hit on the first three shots 41. With the last one shot 41, the shooter hits the moving target 23.

Figure 4:
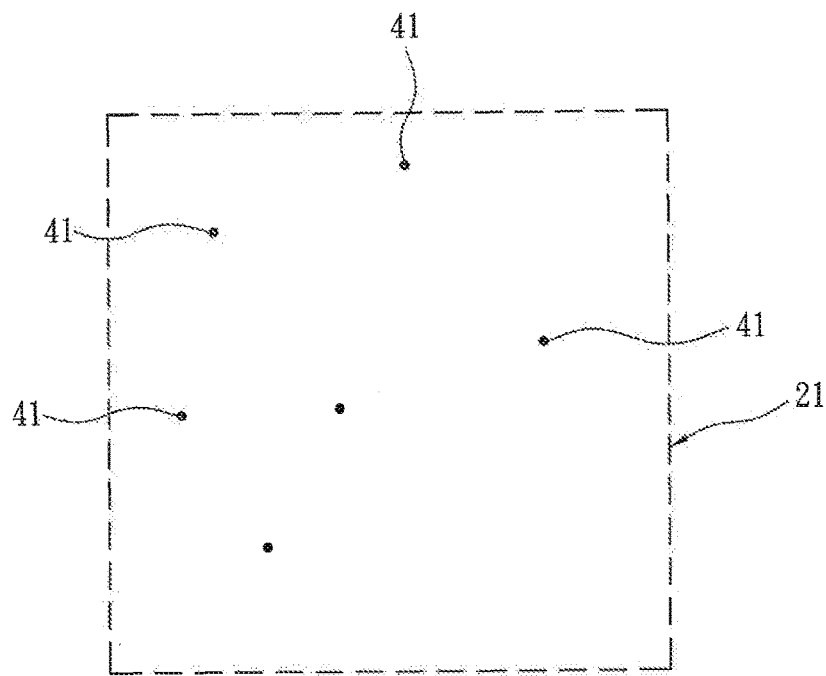
FIG. 4 is another embodiment with a plurality of visible or invisible shots in a virtual target image area according to the present invention.
Figure 5:
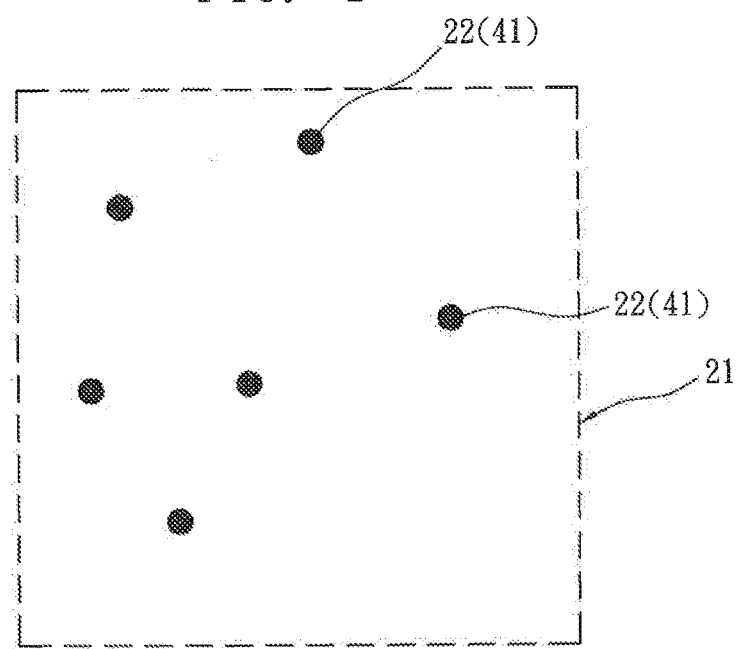
FIG. 5 is a schematic drawing showing the embodiment in FIG. 4 with a plurality of visible shots according to the present invention.

Refer to FIG. 4, the shooting tool 40 shots and a plurality of shots 41 is formed on the target image area 21. Then the lens module 30 detects and gets relative positions of each shot 41. In the figure, there are six shots 41 and the shooting tool 40 is the laser gun. When the laser gun 40 shots the target image area 21 by invisible light such as IR laser pulse to form a plurality of invisible shot 41, the user can choose a capture mode of the lens module 30 and a shot display mode of the projection module 20. Thus the projection module 20 projects visible laser light such as green laser light to show visible shots 22 at the positions corresponding to the shots 41 on the target image area 21 after the lens module 30 detecting and obtaining relative positions (or coordinates) of the invisible shots 41, as shown in FIG. 5. Therefore the user can check accuracy of each shot by the vision. The shooting game has more options and more interest. Moreover, the shooting tool 40 can be a real gun or a laser gun. The main controller 10 or the system 1 of the present invention is preset with hardware, software or firmware that is corresponding to a selection key or a switch key. Thus users can select or switch to different modes by the selection key or the switch key. For example, the capture mode of the lens module 30 or the shot display mode of the projection module 20 can be selected by the keys mentioned above.

Figure 6:
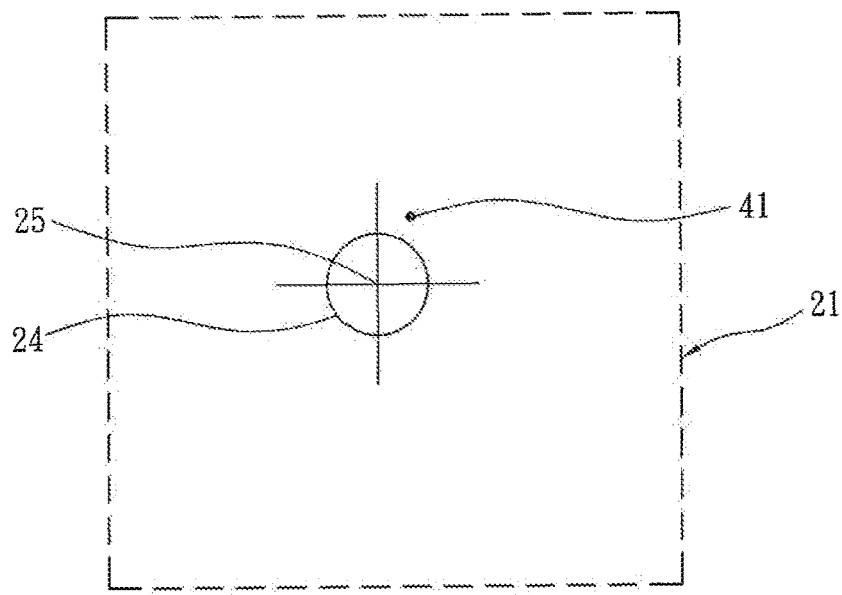
FIG. 6 is a further embodiment with a projected fixed target in a virtual target image area according to the present invention.
Figure 7:
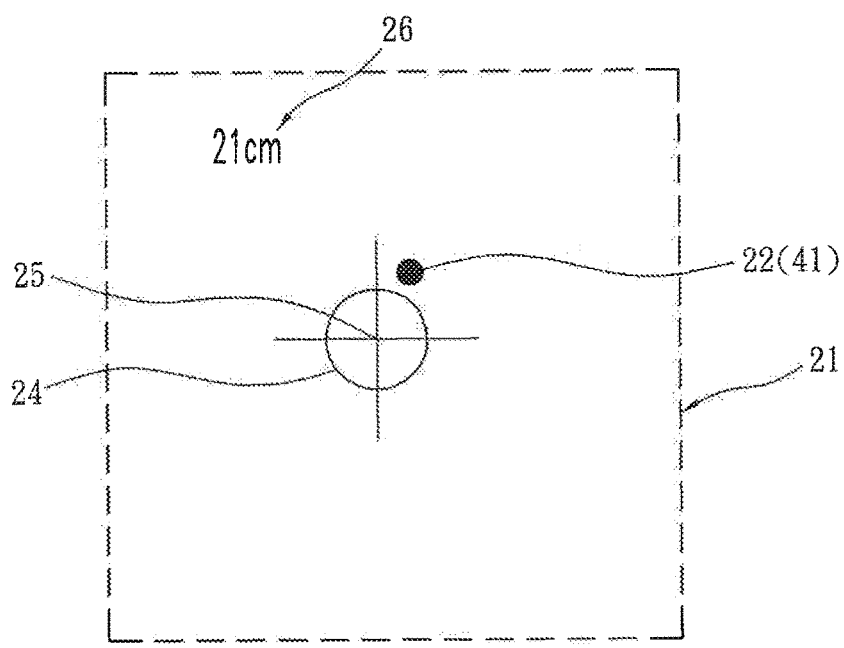
FIG. 7 is a schematic drawing showing the embodiment in FIG. 6 with the fixed virtual target, the shot and a shooting score (error) according to the present invention.

Refer to FIG. 6 and FIG. 7, the virtual target projected on the target image area 21 is a static, fixed target 24. The target 24 is a green dart board having a center point 25. When the user shots the fixed target 24 by using the shooting tool 40 and the shot 41 falls around the center point 25 of the fixed target 24, the fixed virtual target 24, the shot 22 (41) and an additional shooting score (such as error) 26 are shown on the target image area 21 by the projection module 20 due to the design of hardware, software or firmware preset in the main controller 10 or the system 1. Therefore the shooting game is more interesting. As shown in FIG. 7, 21 cm in the figure represents the distance between the shot 22 (41) and the center point 25 of the fixed target 24. The shooting score 26 is calculated and shown as a preset score corresponding to the distance. The additional shooting score 26 can also be calculated by the hardware, software or firmware preset in the main controller 10 or the system 1 with reference to other parameters (such as the distance between the screen 2 and the projection module 20).

Figure 8:
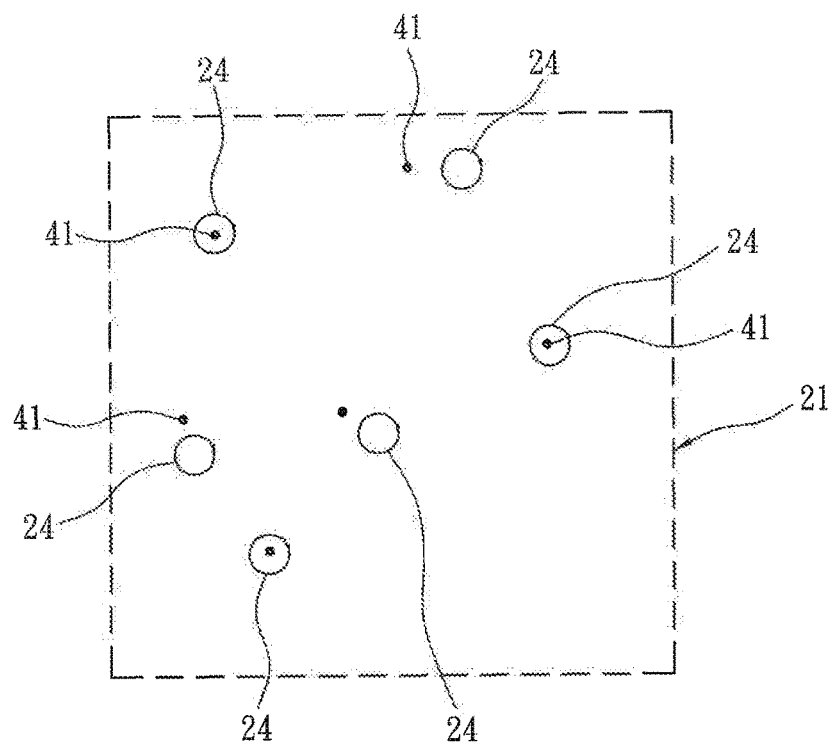
FIG. 8 is a further embodiment with a plurality of projected dynamic or static targets in a virtual target image area according to the present invention.
Figure 9:
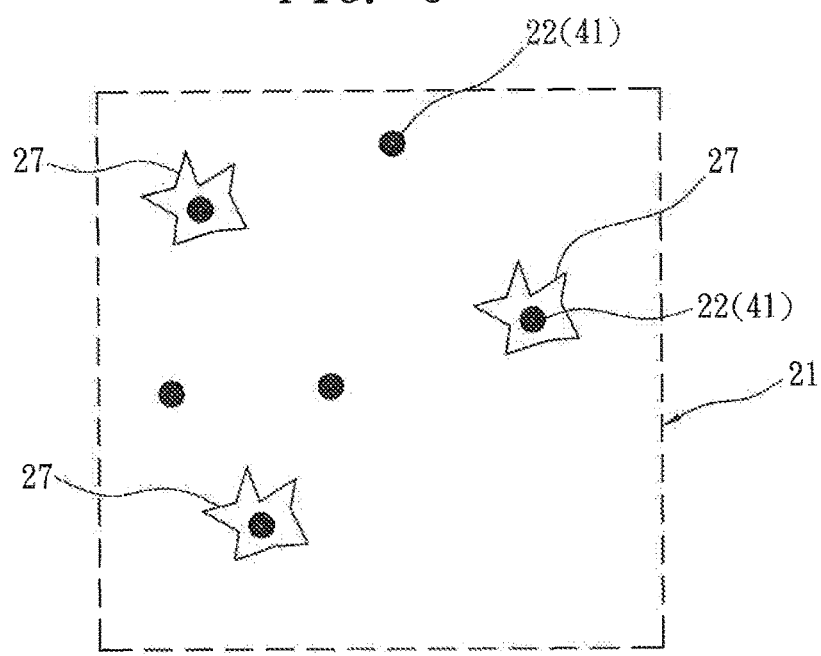
FIG. 9 is a schematic drawing showing the embodiment in FIG. 8 in which each target being shot is with a burst figure according to the present invention.

Refer to FIG. 8 and FIG. 9, there is a plurality of virtual target 24 projected on the target image area 21. As shown in FIG. 8, there are six targets 24 each of which is a green circle formed by projection of green laser light. There are several display modes of the targets 24. For example, the six targets 24 can be shown at the respective position simultaneously for users to shot one after another. Or the six targets 24 are displayed in turn and users can change aiming point quickly along with the jumped target 24. The targets 24 in FIG. 8 can be static virtual targets or dynamic virtual targets.

Furthermore, refer to FIG. 8 and FIG. 9, when a plurality of targets 24 is formed by the shooting tool 40 and is fallen in the target 24, a burst figure 27 can be shown at the shot target 24 on the target image area 21 by the projection module 20 due to the hardware, software or firmware preset in the main controller 10 or the system 1. For example, there are 3 of the 6 targets 24 being shot and shown with the burst figure 27. The shooting/game system is more interesting.

In addition, the hardware, software or firmware can be preset in the main controller 10 according to requirements of the system 1. For example, the main controller 10 of the present invention can be a mobile. Android device such as a smart phone, a tablet computer, etc. Moreover, a Bluetooth-enabled MEMS controller is also used to control the projection module 20 formed by MEMS. The Bluetooth-enabled MEMS Controller is included in the main controller 10.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A shooting training and game system with virtual targets comprising:
   a main controller;
   a projection module;
   a lens module; and
   a shooting tool,
   wherein the main controller is disposed with hardware, software or firmware the shooting training and game system requires,
   wherein the projection module is configured to deflect and project a light beam to form a virtual target image area on a screen in front of the projection module,
   wherein at least one virtual target is shown on the virtual target image area by projection,
   wherein the lens module is aligned with the virtual target image area and configured to detect and obtain relative positions and coordinates of at least one shot formed on the virtual target image area by the shooting tool, wherein the shooting training and game system calculates and checks an error of the shot in relative to the corresponding virtual target for evaluation of accuracy, wherein the shot, the error, a sign representing the virtual target being shot, or their combinations is projected on the virtual target image area by the projection module, wherein the shooting tool includes a real gun and a laser gun, wherein the shot formed on the virtual target image area is a bullet hole when the shooting tool is the real gun, and wherein the shot formed on the virtual target image area is a light spot from the laser gun when the shooting tool is the laser gun.

2. The system as claimed in claim 1, wherein the laser gun emits laser light to hit the virtual target image area, and wherein the laser light is invisible infrared laser light or visible light.

3. The system as claimed in claim 1, wherein a wavelength of the laser light emitted from the laser gun is in a range from 785 nm to 808 nm and no more than 808 nm while duration of the laser light is no less than 0.1 second (≥0.1 sec.).

4. The system as claimed in claim 1, wherein the projection module is selected from the group consisting of a microelectronic mechanical system (MEMS) scanning module, a liquid crystal display (LCD) module, a digital light processing module, and a galvanometric scanner module.

5. The system as claimed in claim 1, wherein the virtual target shown on the virtual target image area by projection includes at least one static virtual target or at least one dynamic virtual target, and wherein the static virtual target is at one fixed point on the virtual target image area while the dynamic virtual target is moved continuously on the virtual target image area.

6. The system as claimed in claim 1, wherein the virtual target shown on the virtual target image area by projection includes a plurality of virtual targets each of which is shown at one fixed point on the virtual target image area and wherein the plurality of virtual targets are jumped among the fixed points.

7. The system as claimed in claim 1, wherein the sign representing the virtual target being shot includes a word or a burst figure.

8. The system as claimed in claim 1, wherein the projection module and the lens module are mechanically connected to and fixed by each other to form a solid object and a detection area of the lens module is aligned with the virtual target image area.

9. The system as claimed in claim 1, wherein the main controller is a mobile Android device.

10. The system as claimed in claim 1, wherein the main controller is a mobile Android device and a Bluetooth-enabled MEMS Controller is used to control the projection module when the projection module is a MEMS scanning module.

* * * * *

UNITED STATES PATENT AND TRADEMARK OFFICE
CERTIFICATE OF CORRECTION

PATENT NO. : 9,733,048 B2
APPLICATION NO. : 14/590546
DATED : August 15, 2017
INVENTOR(S) : Di-Sheng Hu It is certified that error appears in the above-identified patent and that said Letters Patent is hereby corrected as shown below:

On the Title Page

In item (73) Assignee, change "EGISMOS TECHNOLOGY CORPORATION, Newark, DE" to --EGISMOS TECHNOLOGY CORPORATION, Taipei (TW)--.

Signed and Sealed this
Twenty-second Day of May, 2018

Andrei Iancu
*Director of the United States Patent and Trademark Office*